United States Patent
Siemer et al.

(10) Patent No.: US 9,683,302 B2
(45) Date of Patent: Jun. 20, 2017

(54) COMPOSITION FOR METAL ELECTROPLATING COMPRISING LEVELING AGENT

(75) Inventors: Michael Siemer, Mannheim (DE); Cornelia Roeger-Goepfert, Schwetzingen (DE); Nicole Meier, Mannheim (DE); Roman Benedikt Raether, Speyer (DE); Marco Arnold, Heidelberg (DE); Charlotte Emnet, Stuttgart (DE); Dieter Mayer, Darmstadt (DE); Alexander Fluegel, Bad Duerkheim (DE)

(73) Assignee: BASF SE, Ludwigshafen (DE)

( * ) Notice: Subject to any disclaimer, the term of this patent is extended or adjusted under 35 U.S.C. 154(b) by 399 days.

(21) Appl. No.: 13/701,217

(22) PCT Filed: May 31, 2011

(86) PCT No.: PCT/IB2011/052385
§ 371 (c)(1),
(2), (4) Date: Nov. 30, 2012

(87) PCT Pub. No.: WO2011/151785
PCT Pub. Date: Dec. 8, 2011

(65) Prior Publication Data
US 2013/0068626 A1  Mar. 21, 2013

Related U.S. Application Data

(60) Provisional application No. 61/350,045, filed on Jun. 1, 2010.

(51) Int. Cl.
*C25D 3/58* (2006.01)
*C25D 3/38* (2006.01)
(Continued)

(52) U.S. Cl.
CPC ........... *C25D 3/38* (2013.01); *C08G 73/0616* (2013.01); *C08L 79/04* (2013.01); *C23C 18/31* (2013.01);
(Continued)

(58) Field of Classification Search
CPC .... C25D 3/52; C25D 3/38; C25D 3/58; C08L 79/04; C07D 231/12
(Continued)

(56) References Cited

U.S. PATENT DOCUMENTS 3,108,006 A * 10/1963 Gore ....................... C23C 18/31
106/1.25
5,077,414 A * 12/1991 Arduengo, III ............ 548/335.1
(Continued)

FOREIGN PATENT DOCUMENTS

EP  1 069 211  1/2001
EP  1 619 274  1/2006
(Continued)

OTHER PUBLICATIONS

Hai et al., "Copolymers of Imidazole and 1,4-Butandiol Diglycidyl Ether as an Efficient Suppressor Additive for Copper Electroplating," Journal of the Electrochemical Society (2014), vol. 161, No. 9, pp. D381-D387.*
(Continued)

*Primary Examiner* — Edna Wong
(74) *Attorney, Agent, or Firm* — Oblon, McClelland, Maier & Neustadt, L.L.P.

(57) ABSTRACT

A composition comprising a source of metal ions and at least one leveling agent comprising a linear or branched, polymeric imidazolium compound comprising the structural unit of formula L1 (L1) wherein $R^1$, $R^2$, $R^3$ are each independently selected from an H atom and an organic radical
(Continued)

having from 1 to 20 carbon atoms, R4 is a divalent, trivalent or mutlivalent organic radical which does not comprise a hydroxyl group in the α or β position relative to the nitrogen atom of the imidazole rings is an integer.

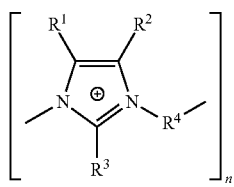

(L1)

19 Claims, 7 Drawing Sheets

(51) Int. Cl.
    C25D 5/02    (2006.01)
    C08G 73/06   (2006.01)
    C08L 79/04   (2006.01)
    C23C 18/31   (2006.01)
    C25D 3/02    (2006.01)
    C25D 3/32    (2006.01)

(52) U.S. Cl.
    CPC ............ C25D 3/02 (2013.01); C25D 3/32 (2013.01); C25D 3/58 (2013.01); C25D 5/02 (2013.01)

(58) Field of Classification Search
    USPC ............... 205/297, 239, 298, 118, 123, 125
    See application file for complete search history.

(56) References Cited

U.S. PATENT DOCUMENTS

| | | | |
|---|---|---|---|
| 6,024,857 A | 2/2000 | Reid | |
| 6,416,770 B1 | 7/2002 | Leduc et al. | |
| 6,610,192 B1 | 8/2003 | Step et al. | |
| 7,510,639 B2* | 3/2009 | Wang | C08G 59/184 106/1.26 |
| 2002/0033340 A1* | 3/2002 | Cheung et al. | 205/101 |
| 2003/0168343 A1 | 9/2003 | Commander et al. | |
| 2003/0201191 A1* | 10/2003 | Kovarsky et al. | 205/775 |
| 2004/0249177 A1 | 12/2004 | Wang et al. | |
| 2006/0016693 A1 | 1/2006 | Wang et al. | |
| 2006/0118422 A1 | 6/2006 | Ko et al. | |
| 2006/0149074 A1* | 7/2006 | Maase et al. | 548/102 |
| 2006/0207886 A1 | 9/2006 | Isono et al. | |
| 2010/0029519 A1* | 2/2010 | Schwab et al. | 508/208 |
| 2011/0263810 A1 | 10/2011 | Siemer et al. | |

FOREIGN PATENT DOCUMENTS

| | | | |
|---|---|---|---|
| JP | 55 122892 | 9/1980 | |
| JP | 4 202305 | 7/1992 | |
| JP | 7 54188 | 2/1995 | |
| JP | 09-272995 | * 10/1997 | ............ C25D 3/32 |
| JP | 09272995 A | * 10/1997 | |
| JP | 2004 217565 | 8/2004 | |
| JP | 2008-195990 | * 8/2008 | ............ C25D 3/44 |
| KR | 10 2008 0027618 | 3/2008 | |
| WO | 2005 066391 | 7/2005 | |
| WO | 2010 069810 | 6/2010 | |
| WO | 2010 072571 | 7/2010 | |

OTHER PUBLICATIONS

Lee et al., "Ion Conduction in Imidazolium Acrylate Ionic Liquids and Their Polymers," Chem. Mater. (2010), vol. 22, pp. 5814-5822.*

U.S. Appl. No. 13/994,540, filed Jun. 14, 2013, Roeger-Goepfert, et al.

International Search Report Issued Oct. 20, 2011 in PCT/IB11/052385 Filed May 31, 2011.

* cited by examiner

Fig. 3c (comparative)

Fig. 4c (comparative)

Fig. 4d (comparative)
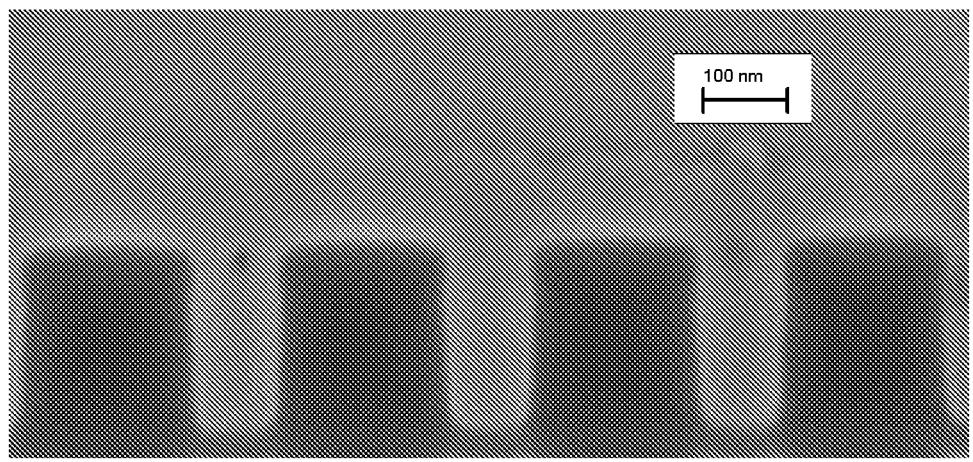
Fig. 4e (comparative)
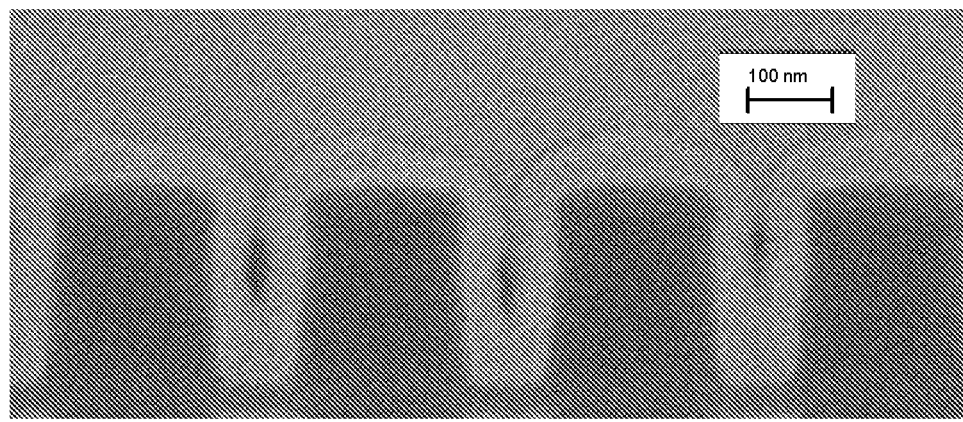

Fig. 4f (comparative)
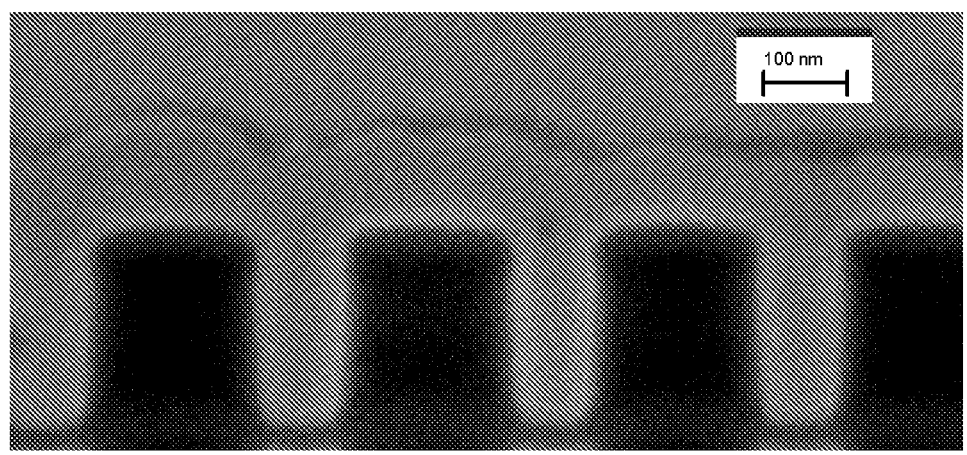

Fig. 5a (comparative)
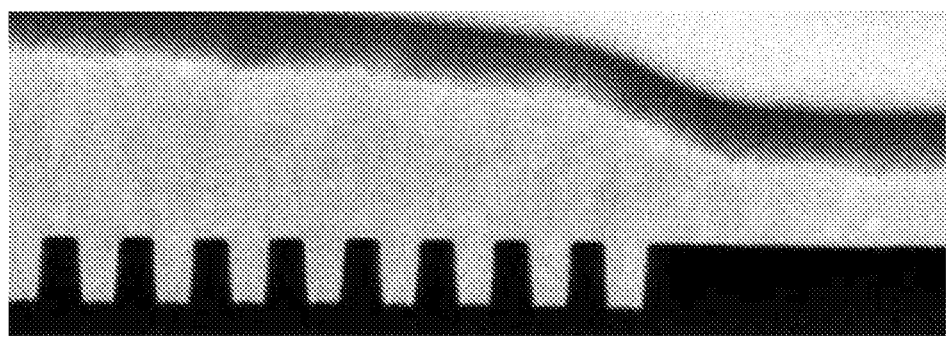
Fig. 5b (comparative)
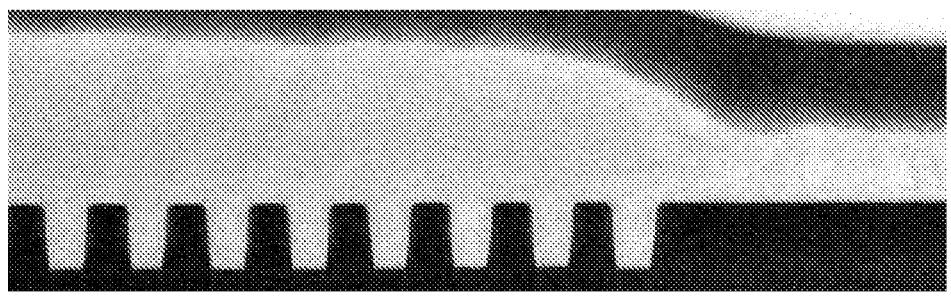

COMPOSITION FOR METAL ELECTROPLATING COMPRISING LEVELING AGENT

The invention relates to electroplating compositions comprising a leveling agent.

Filling of small features, such as vias and trenches, by copper electroplating is an essential part of the semiconductor manufacture process. It is well known, that the presence of organic substances as additives in the electroplating bath can be crucial in achieving a uniform metal deposit on a substrate surface and in avoiding defects, such as voids and seams, within the copper lines.

One class of additives are the so-called levelers. Levelers are used to provide a substantially planar surface over the filled features. In literature, a variety of different leveling compounds has been described. In most cases, leveling compounds are N-containing and optionally substituted and/or quaternized polymers, such as polyethylene imine, polyglycine, poly(allylamine), polyaniline (sulfonated), polyurea, polyacrylamide, poly(melamine-co-formaldehyde), polyaminoamides and polyalkanolamines.

Furthermore, the use of polymeric compounds comprising heteroaromatic repeating units like polyvinylpyridine (EP1069211 A2, WO 2005/066391 A1), polyvinylimidazole (US 2006207886 A1, US 2003/0168343 A1), polyvinylpyrrolidone (U.S. Pat. No. 6,024,857), or copolymers of vinylimidazol and vinylpyrollidone (US 2006/207886 A1, US 2006/118422 A1) has been described. However, all of these are polymerized via the vinyl group bound to the heteroaromatic ring, thus forming an alkane chain to which the heteroaromatic rings are bound.

Polyimidazolium compounds are generally known as dispersants. Thus, for example, U.S. Pat. No. 6,416,770 B1 describes polymeric imidazolium compounds and its use in cosmetic compositions. Corresponding compounds and their use as phase transfer catalysts are also known from Journal of Fluorine Chemistry 128 (2007), pages 608 to 611. JP 2004217565 and Journal of Pharmaceutical Sciences, Vol.77, No. 6, June 1988, disclose the reaction of imidazole derivatives with epichlorohydrin to give polymeric imidazolium compounds and their use as ion-exchange resin.

U.S. Pat. No. 6,610,192 B1 discloses leveling agents for use in electroplating prepared by reacting a heterocyclic amine compound like imidazol with an epihalohydrin. US2004249177 and US20060016693 A1 disclose leveling agents for use in electroplating prepared by reacting an amine compound like imidazol with epichlorhydrin and a glycol compound. EP1619274 A2 discloses a leveler prepared by reacting an amine compound like imidazol with a polyepoxide compound like 1,4-butanediol diglycidyl ether. All of these reactions lead to polyimidazolium-polyalkohol compounds.

Unpublished International Patent Application No. PCT/EP2009/066781 describes a new way of synthesizing polyimidazolium salts, starting from glyoxal, formalin, an acid and a primary multiamine. This synthesis route opens up a plethora of new polymeric imidazolium compounds, e.g. depending on which multiamine is used.

It has now been found that polyimidazolium compounds are very efficient leveling agents providing a uniform and planar metal deposit over features of different width including very small features of 40 nm width or smaller. Compared to reaction products of imidazole with alkylene oxides as leveling agents polyimidazolium compounds provide substantially defect-free gap filling also meaning void-free gap filling particularly in vias and trenches of 100 nm width or smaller.

BRIEF DESCRIPTION OF DRAWINGS

FIG. 3a-c. 3a) shows plating experiments performed with substrates carrying 16 to 37 nm wide trenches; 3b) experiments performed with plating bath solutions containing either the leveler 1 according to the present invention and 3c) with no leveler.

FIG. 4a-f. 4a) shows plating experiments with substrates carrying 100 nm wide trenches; 4b) shows plating bath solutions containing leveler 1 according to the present invention; 4d), 4e), 4f) same as in 4b) but for reference leveler 3; 4c) shows control experiment accomplished without any levelling agent in the plating bath solution.

FIG. 5a-b show plating experiments performed with substrates comprising apertures of 130 nm width and plating bath solutions containing reference leveler 2 as levelling agent. The resulting SEM images are shown in FIGS. 5b and 5a, respectively.

Figure 1A:
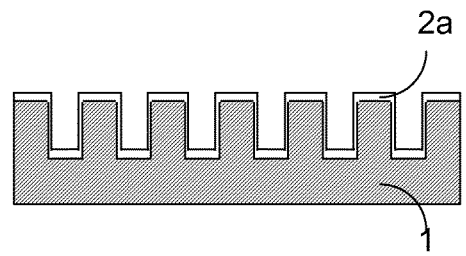
FIG. 1a-c. 1a) shows a dielectric substrate 1 seeded with a copper layer 2a; 1b) shows a copper layer 2' deposited onto the dielectric substrate 1 by electrodeposition; 1c) shows trenches 2c of the substrate 1 filled and an overplating of copper 2b.

It is an object of the present invention to provide a copper electroplating additive having good leveling properties, in particular leveling agents capable of providing a substantially planar copper layer and filling features on the nanometer and on the micrometer scale without substantially forming defects, such as but not limited to voids, with a metal electroplating bath, preferably a copper electroplating bath.

It has been surprisingly discovered that non hydroxyl functionalized polyimidazolium compounds and derivatives thereof can be used as levelling additives in metal, particularly in copper electroplating baths showing an improved leveling performance without influencing the superfilling, particularly on substrates having apertures below 30 nm.

The present invention is particularly suitable for filling high aspect ratio features having ratios of 4:1 or greater such as 11:1 and even higher with copper such that the vias and trenches are substantially free of voids and preferably completely free of voids. The present invention is suitable for filling features that are greater than 100 nm, and particularly suitable for filling features that are of 100 nm width or smaller.

The agents/additives according to the present invention can further advantageously be used for electroplating of copper in through silicon vias (TSV). Such vias normally have widths of several micrometers up to 100 micrometers and large aspect ratios of at least 4, sometimes above 10.

Furthermore the agents/additives according to the present invention can advantageously be used in bonding technologies such as the manufacture of copper pillars of typically 50 to 100 micrometers height and width for the bumping process, in circuit board technologies like the manufacture of high-density-interconnects on printed circuit boards using microvia plating or plated-through-hole technologies, or in other packaging processes for electronic circuits.

The present invention provides a composition comprising a source of metal ions and at least one additive comprising a linear or branched, polymeric imidazolium compound comprising the structural unit of formula 1

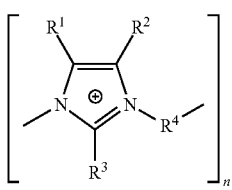

(L1)

wherein $R^1$, $R^2$, $R^3$ are each independently selected from an H atom and an organic radical having from 1 to 20 carbon atoms, $R^4$ is a divalent, trivalent or multivalent organic radical which does not comprise a hydroxyl group in the α or β position relative to the nitrogen atom of the imidazole rings.

n is an integer.

It has been found that the use of compositions according to the present invention for electroplating provides deposited metal layers, particularly copper layers, having reduced overplating, particularly reduced mounding. The metal layers provided by the present invention are substantially planar, even on substrates exhibiting apertures of a very wide range of different aperture sizes (scale: ≤130 nanometers to 2 micrometers). Furthermore it has been found that the present invention provides metal layers substantially without the formation of added defects, such as voids, in the features.

A further significant advantage of this leveling effect is that less material has to be removed in post-deposition operations. For example, chemical mechanical polishing (CMP) is used to reveal the underlying features. The more level deposit of the invention corresponds to a reduction in the amount of metal which must be deposited, therefore resulting in less removal later by CMP. There is a reduction in the amount of scrapped metal and, more significantly, a reduction in the time required for the CMP operation. The material removal operation is also less severe which, coupled with the reduced duration, corresponds to a reduction in the tendency of the material removal operation to impart defects.

In contrast to the prior art leveling agents the additive according to the present inventions are polyimidazolium compounds in which the heteroaromatic system is incorporated in the polymeric backbone and which do not contain hydroxyl groups in α or β position relative to the nitrogen atom of the imidazole rings.

Generally, $R^1$ and $R^2$ may be an H atom or an organic radical having from 1 to 20 carbon atoms. The radicals can be branched or unbranched or comprise functional groups which can, for example, contribute to further crosslinking of the polymeric imidazolium compound. Preferably, $R^1$ and $R^2$ are each, independently of one another, hydrogen atoms or hydrocarbon radicals having from 1 to 6 carbon atoms. Most preferably $R^1$ and $R^2$ are H atoms.

Generally, $R^3$ may be an H atom or an organic radical having from 1 to 20 carbon atoms. Preferably, $R^3$ is an H atom.

Generally, $R^4$ may be any m-valent organic radical. The m-valent organic radical can be the radical of a polymer, e.g. a polyvinylamine as mentioned above, and then has a correspondingly high molecular weight.

The organic radical $R^4$ may comprise not only carbon and hydrogen but also heteroatoms such as oxygen, nitrogen, sulfur or halogens, e.g. in the form of functional groups such as hydroxyl groups, ether groups, amide groups, aromatic heterocycles, primary, secondary, or tertiary amino groups or imino groups.

The organic radical $R^4$ may be, in particular, a hydrocarbon diradical which can be substituted or interrupted by functional groups comprising heteroatoms, in particular ether groups. If substituted, it is preferred that $R^4$ does not comprise any hydroxyl groups.

$R^4$ may preferably be a pure hydrocarbon radical or a hydrocarbon radical interrupted or substituted by ether groups, secondary amino groups or tertiary amino groups. In a particular embodiment, $R^4$ is a pure hydrocarbon radical and does not comprise any functional groups. Most preferably, $R^4$ is a linear or branched $C_2$ to $C_{10}$ alkandiyl group, in particular a linear $C_2$ to $C_6$ alkandiyl group.

The hydrocarbon radical may be aliphatic or aromatic or comprise both aromatic and aliphatic groups.

n may generally be an integer from 2 to about 6000, preferably from about 5 to about 3000, even more preferably from about 8 to about 1000, even more preferably from about 10 to about 300, even more preferably from about 15 to about 250, most preferably from about 25 to about 150.

The mass average molecular weight $M_w$ may generally be from 500 g/mol to 1000000 g/mol, preferably from 1000 g/mol to 500000 g/mol, more preferably from 1500 g/mol to 100000 g/mol, even more preferably from 2000 g/mol to 50000 g/mol, even more preferably from 3000 g/mol to 40000 g/mol, most preferably from 5000 g/mol to 25000 g/mol.

Preferably the at least one additive may comprise a counterion $Y^{o-}$, wherein o is an integer. Most preferably, the counterion $Y^{o-}$ is chloride, sulfate or acetate.

Preferably the number average molecular weight $M_n$ of the polymeric imidazolium compound, determined by gel permeation chromatography, may be greater than 500 g/mol.

Preferably the polymeric imidazolium compound may comprise more than 80% by weight of structural units of the formula L1.

Preferably the composition according to anyone of the preceding claims, wherein the additive is preparable by reacting an α-dicarbonyl compound $R^1$—CO—CO—$R^2$,
an aldehyde $R^3$—CHO,
at least one amino compound $(NH_2—)_m R^4$
protic acid $(H^+)_o Y^{o-}$,
wherein $R^1$, $R^2$, $R^3$, $R^4$, Y, and o have the prescribed meanings.

Preferably the amino compound may be an aliphatic or aromatic diamine, triamine, multiamin, or mixtures thereof.

Preferably the metal ions may comprise copper ion.

Preferably the composition may further comprise one or more accelerating agents and/or one or more suppressing agents.

A further embodiment of the present invention is the use of the additives as described herein in a bath for depositing metal containing layers.

Yet another embodiment of the present invention is a process for depositing a metal layer on a substrate by contacting a plating solution as described herein with the substrate, and applying a current to the substrate to deposit a metal layer onto the substrate. The process is particularly useful for depositing metal, particularly copper layers on substrate comprising micrometer and/or submicrometer-sized features.

Preferably the substrate comprises micrometer or submicrometer sized features and the deposition is performed to fill the micrometer or submicrometer sized features. Most preferably the micrometer or submicrometer-sized features have a size from 1 to 1000 nm and/or an aspect ratio of 4 or more.

As used herein, "feature" refers to the geometries on a substrate, such as, but not limited to, trenches and vias. "Apertures" refer to recessed features, such as vias and trenches. As used herein, the term "plating" refers to metal electroplating, unless the context clearly indicates otherwise. "Deposition" and "plating" are used interchangeably throughout this specification. The term "alkyl" means C1 to C30 alkyl and includes linear, branched and cyclic alkyl. "Substituted alkyl" means that one or more of the hydrogens on the alkyl group is replaced with another substituent group, such as, but not limited to, cyano, hydroxy, halo, (C1-C6)alkoxy, (C1-C6)alkylthio, thiol, nitro, and the like. As used herein "aryl" includes carbocyclic and heterocyclic aromatic systems, such as, but not limited to, phenyl, naphthyl and the like. By "substituted aryl" is meant that one or more hydrogens on the aryl ring are replaced with one or more substituent groups, such as, but not limited to, cyano, hydroxy, halo, (C1-C6)alkoxy, (C1-C6)alkyl, (C2-C6)alkenyl, (C1-C6)alkylthio, thiol, nitro, and the like. As used herein "alkaryl" includes alkyl substituted carbocyclic and heterocyclic aromatic systems, such as, but not limited to, benzyl, naphthylmethyl and the like. As used herein "polymer" generally means any compound comprising at least two monomeric units i.e. the term polymer includes dimers, trimers, etc., oligomers as well as high molecular weight polymers.

As used herein, "accelerator" refers to an organic compound that increases the plating rate of the electroplating bath on at least part of a substrate. The terms "accelerator" and "accelerating agent" are used interchangeably throughout this specification. In literature, sometimes the accelerator component is also named "brightener", "brightening agent" or "anti-suppressor". "Suppressor" refers to an organic compound that decreases the plating rate of the electroplating bath on at least part of a substrate. The terms "suppressors" and "suppressing agents" are used interchangeably throughout this specification. "Leveler" refers to an organic compound that is capable of providing a substantially planar metal layer. The terms "levelers", "leveling agents" and "leveling additive" are used interchangeably throughout this specification.

Although the additive according to the present invention has strong leveling properties in electroplating of submicron-sized features the use and performance of the additives according to the present invention is not limited to its leveling properties and may advantageously be used in other metal plating applications, e.g. for depositing through silicon vias (TSV), for other purposes.

The present invention provides a plated metal layer, particularly a plated copper layer, on a substrate containing features on the nanometer and/or micrometer scale wherein the metal layer has reduced overplating and all features are substantially free of added voids, and preferably substantially free of voids. "Overplating" refers to a thicker metal deposit over dense feature areas as compared to areas free of features or at least containing relatively few features. "Dense feature areas" means an area exhibiting smaller distances between neighboring features compared to a comparative area containing apertures with a relatively large distance in between. Smaller distances means distances below 2 micrometer, and preferably below 1 micrometer, and even more preferably below 500 nm. Such difference in the plating thickness over dense feature areas as compared to the plating thickness over areas free of features or containing relatively few features is referred to as "step height" or "mounding". Suitable substrates are any used in the manufacture of electronic devices, such as integrated circuits. Such substrates typically contain a number of features, particularly apertures, having a variety of sizes. Particularly suitable substrates are those having apertures on the nanometer and on the micrometer scale.

The present invention is achieved by combining one or more additives capable of providing a substantially planar copper layer and filling features on the nanometer and on the micrometer scale without substantially forming defects, such as but not limited to voids, with a metal electroplating bath, preferably a copper electroplating bath.

The additives according to the present invention may be prepared by any preparation method.

A preferred process for preparation is performed by reacting (a) an α-dicarbonyl compound, (b) an aldehyde, (c) at least one amino compound having at least two primary amino groups and (d) a protic acid with one another as described in the unpublished International patent application No. PCT/EP2009/066781 which is hereby incorporated by reference. The above compounds are defined by their content of functional groups. It is also possible, for example, for two of the above compounds to be identical when, for example, a compound comprises both an acid function and, for example, two primary amino groups or an aldehyde group. The reaction is a polycondensation. In a polycondensation, polymerization occurs with elimination of a low molecular weight compound such as water or alcohol.

In the present case, water is eliminated. When the carbonyl groups of the α-dicarbonyl compound are present completely or partly as ketal and/or the aldehyde group of the aldehyde is present as acetal or hemiacetal, an alcohol is correspondingly eliminated instead of water.

The α-dicarbonyl compound (a) is preferably a compound of the formula L2a $$R^1\text{—}CO\text{—}CO\text{—}R^2 \qquad (L2a)$$

The compound is particularly preferably glyoxal.

The carbonyl groups of the α-dicarbonyl compound can also be present as ketal or hemiketal, preferably as hemiketal or ketal of a lower alcohol, e.g. a C1-C10-alkanol. In this case, the alcohol is eliminated in the later condensation reaction.

The carbonyl groups of the α-dicarbonyl compound are preferably not present as hemiketal or ketal.

The aldehyde compound (b) may be any compound having at least one aldehyde group. The aldehyde is in particular an aldehyde of the formula L2b $$R^3\text{—}CHO \qquad (L2b)$$

The aldehyde group of the aldehyde can also be present as hemiacetal or acetal, preferably as hemiacetal or acetal of a lower alcohol, e.g. a C1-C10-alkanol. In this case, the alcohol is eliminated in the later condensation reaction.

The aldehyde group is preferably not present as hemiacetal or acetal.

The amino compound (c) is a compound having at least two primary amino groups.

The amino compound can be represented by the general formula L2c $$(NH_2\text{—})_m R^4 \qquad (L2c)$$

wherein m is an integer greater than or equal to 2 and indicates the number of amino groups. m can be very large values, e.g. m can be an integer from 2 to 10 000, in particular from 2 to 5000. Very high values of m are present, for example, when polyamines such as polyvinylamine or polyethylenimine are used.

When compounds having m=2 (diamines) are used in the reaction, linear, polymeric imidazolium compounds are formed, while in the case of amines having more than two primary amino groups, branched polymers are formed.

In a preferred embodiment, m is an integer from 2 to 6, in particular from 2 to 4. Very particular preference is given to m=2 (diamine) or m=3 (triamine). Very particular preference is given to m=2.

In a preferred embodiment, the amino compound comprises at most ether groups, secondary or tertiary amino groups and apart from these no further functional groups. Mention may be made of, for example, polyether amines. $R^4$ is therefore preferably a pure hydrocarbon radical or a hydrocarbon radical interrupted or substituted by ether groups, secondary amino groups or tertiary amino groups. In a particular embodiment, $R^4$ is a pure hydrocarbon radical and does not comprise any functional groups. The hydrocarbon radical can be aliphatic or aromatic or comprise both aromatic and aliphatic groups.

Possible amino compounds are amino compounds, preferably diamines, in which the primary amino groups are bound to an aliphatic hydrocarbon radical, preferably an aliphatic hydrocarbon radical having from 2 to 50 carbon atoms, particularly preferably from 3 to 40 carbon atoms.

Further possible amino compounds are amino compounds, preferably diamines, in which the primary amino groups are bound directly to an aromatic ring system, e.g. a phenylene or naphthylene group, or amino compounds in which the primary amino groups are bound to aliphatic groups as alkyl substituents of an aromatic ring system.

Diamines which may be mentioned are, in particular, C2-C20-alkylenediamines such as 1,4-butylenediamine or 1,6-hexylenediamine.

Possible triamines are, for example, aliphatic compounds of the formula L2d

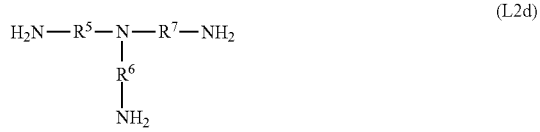

(L2d)

where $R^5$, $R^6$ and $R^7$ are each, independently of one another, a C1-C10 alkylene group, particularly preferably a C2-C6-alkylene group.

In the simplest case, the radicals $R^5$, $R^6$ and $R^7$ have the same meaning; an example which may be mentioned is triaminoethylamine ($R^5$=$R^6$=$R^7$=ethandiyl).

Compounds having the following structures may also be used:

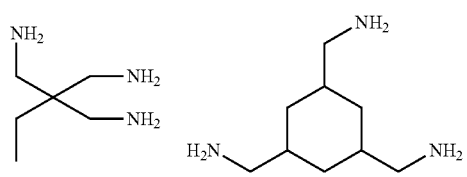

It is also possible to use, in particular, mixtures of amino compounds in the process of the invention. In this way, polymeric imidazolium compounds which comprise different molecular groups between the imidazole rings are obtained. The use of such mixtures makes it possible to set desired properties such as leveling efficiency in a targeted way.

As mixtures of amino compounds, it is possible to use, for example, mixtures of various aliphatic amino compounds or mixtures of various aromatic amino compounds and also mixtures of aliphatic and aromatic amino compounds. The amino compounds in the mixtures can be amino compounds having different numbers of primary amino groups. When diamines are used in the process of the invention, linear polymers are obtained. When amino compounds having three or more primary amino groups are used, crosslinked and/or branched structures are formed. The use of diamines in admixture with amino compounds having more than two primary amino groups, e.g. triamines, enables the desired degree of crosslinking or degree of branching to be set via the proportion of triamines.

Amino compounds having a hydroxyl group in the β position relative to one of the primary amino groups can also be used as amino compounds. In this case, polymeric imidazolium compounds which have been able to be obtained according to the prior art by reaction of imidazole derivatives with epichlorohydrin or other epoxy compounds (see above) can also be obtained by the process of the invention. However, the use of such compounds is not absolutely necessary for the purposes of the invention, so that it can also be dispensed with.

In a preferred embodiment, the amino compound has a molecular weight of less than 10 000 g/mol, particularly preferably less than 5000 g/mol, very particularly preferably less than 1000 g/mol, in most preferably less than 500 g/mol.

Possible diamines and triamines are, in particular, compounds having a molecular weight of from 60 to 500 g/mol or from 60 to 250 g/mol.

In the process of preparing the additives according to the invention, it is possible to use further compounds, e.g. in order to introduce specific end groups into the polymer or bring about additional crosslinking by means of further functional groups, to set defined properties or to make further reactions on the resulting polymer (polymer-analogous reactions) at a later point in time possible.

Thus, if desired, it is possible to make concomitant use of, for example, compounds having only one primary amino group in order to influence the molecular weight of the polymeric imidazolium compounds. The compound having only one primary amino group leads to chain termination and then forms the end group of the polymer chain concerned. The higher the proportion of compounds having only one primary amino group, the lower the molecular weight. Based on 100 mol of amino compounds having at least two primary amino groups, it is possible, in a preferred embodiment, to use, for example, from 0 to 10 mol of compounds having only one primary group.

The protic acid (d) can be represented by the formula $Y^{o-}(H^+)_o$, where o is an integer. It can also be a polymeric protic acid, e.g. polyacrylic acid; in this case, o may be very high values. As such polymeric protic acids, mention may be made of, for example, polyacrylic acid, polymethacrylic acid or a copolymer of (meth)acrylic acid, maleic acid, fumaric acid or itaconic acid with any other monomers, e.g. with (meth)acrylates, vinyl esters or aromatic monomers such as styrene, or another polymer having a plurality of carboxyl groups.

In a preferred embodiment, o is an integer from 1 to 4, particularly preferably 1 or 2. In a particular embodiment, o is 1.

The anion $Y^{o-}$ of the protic acid forms the counterion to the imidazolium cations of the polymeric imidazolium compound.

The anion of the protic acid is, for example, selected from $F^-$, $Cl^-$, $NO_2^-$, $NO_3^-$, the group of sulfates, sulfites and sulfonates, e.g. $SO_4^{2-}$, $HSO_4^-$, $SO_3^{2-}$, $HSO_3^-$, $H_3COSO_3^-$, $H_3CSO_3^-$, phenylsulfonate, p-tolylsulfonate, $HCO_3^-$, $CO_3^{2-}$, the group of alkoxides and aryloxides, e.g. $H_3CO^-$, $H_5C_2O^-$, the group of phosphates, phosphonates, phosphinates, phosphites, phosphonites and phosphinites, e.g. $PO_4^{3-}$, $HPO_4^{2-}$, $H_2PO_4^-$, $PO_3^{3-}$, $HPO_3^{2-}$, $H_2PO_3^-$, the group of carboxylates, e.g. formate and acetate, and the group of halogenated hydrocarbons, e.g. $CF_3SO_3^-$, $(CF_3SO_3)_2N^-$, $CF_3CO_2^-$ and $CCl_3CO_2^-$ The products received in this way may be subjected to a typical anion exchange by means of precipitation or by anion exchange resins to receive a desired counter-ion.

The reaction of the starting compounds is preferably carried out in water, a water-miscible solvent or mixtures thereof.

Water-miscible solvents are, in particular, protic solvents, preferably aliphatic alcohols or ethers having not more than 4 carbon atoms, e.g. methanol, ethanol, methyl ethyl ether, tetrahydrofuran. Suitable protic solvents are miscible with water in any ratio (at 1 bar, 21° C.).

The reaction is preferably carried out in water or mixtures of water with the above protic solvents. The reaction is particularly preferably carried out in water.

The reaction of the starting components can be carried out at, for example, pressures of from 0.1 to 10 bar, in particular atmospheric pressure, and, for example, at temperatures of from 5 to 100° C., in particular from 5 to 50° C., particularly preferably from 10 to 40° C.

The starting components can be combined in any order.

The reaction can be carried out batchwise, semicontinuously or continuously. In the semicontinuous mode of operation, it is possible, for example, for at least one starting compound to be initially charged and the other starting components to be metered in.

In the continuous mode of operation, the starting components are combined continuously and the product mixture is discharged continuously. The starting components can be fed in either individually or as a mixture of all or part of the starting components. In a particular embodiment, the amine and the acid are mixed beforehand and fed in as one stream, while the other components can be fed in either individually or likewise as a mixture (2nd stream).

In a further particular embodiment, all starting components comprising carbonyl groups (i.e. the α-dicarbonyl compound, the aldehyde and the protic acid of the anion X if the latter is a carboxylate) are mixed beforehand and fed in together as a stream; the remaining amino compound is then fed in separately.

The continuous preparation can be carried out in any reaction vessels, i.e. in a stirred vessel. It is preferably carried out in a cascade of stirred vessels, e.g. from 2 to 4 stirred vessels, or in a tube reactor.

The reaction proceeds in principle according to the following reaction equation.

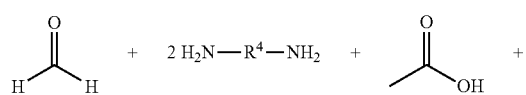

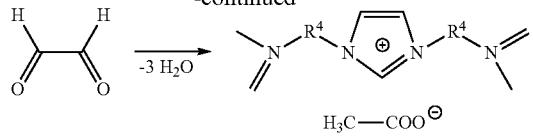

Instead of $CH_3COO^-$ any other anion mentioned above may be used or $CH_3COO^-$ may be subjected to anion exchange by means of precipitation or by anion exchange resins to get a desired counter-ion.

Here, 1 mol of aldehyde, 2 mol of primary amino groups and 1 mol of acid group ($H^+$) of the protic acid are required per 1 mol of α-dicarbonyl compound. In the polymer obtained, the imidazolium groups are joined to one another by the diamine.

High molecular weights can be achieved when the compounds are used in the above, equimolar amounts.

It will be appreciated by those skilled in the art that more than one leveling agent may be used. When two or more leveling agents are used, at least one of the leveling agents is a polyimidazolium compound or a derivative thereof as described herein. It is preferred to use only one polyimidazolium leveling agent in the plating bath composition.

Suitable additional leveling agents include, but are not limited to, polyaminoamide and derivatives thereof, polyalkanolamine and derivatives thereof, polyethylene imine and derivatives thereof, quaternized polyethylene imine, polyglycine, poly(allylamine), polyaniline, polyurea, polyacrylamide, poly(melamine-co-formaldehyde), reaction products of amines with epichlorohydrin, reaction products of an amine, epichlorohydrin, and polyalkylene oxide, reaction products of an amine with a polyepoxide, polyvinylpyridine, polyvinylimidazole, polyvinylpyrrolidone, or copolymers thereof, nigrosines, pentamethyl-para-rosaniline hydrohalide, hexamethyl-pararosaniline hydrohalide, or compounds containing a functional group of the formula N—R—S, where R is a substituted alkyl, unsubstituted alkyl, substituted aryl or unsubstituted aryl. Typically, the alkyl groups are (C1-C6)alkyl and preferably (C1-C4)alkyl. In general, the aryl groups include (C6-C20)aryl, preferably (C6-C10)aryl. Such aryl groups may further include heteroatoms, such as sulfur, nitrogen and oxygen. It is preferred that the aryl group is phenyl or napthyl. The compounds containing a functional group of the formula N—R—S are generally known, are generally commercially available and may be used without further purification.

In such compounds containing the N—R—S functional group, the sulfur ("S") and/or the nitrogen ("N") may be attached to such compounds with single or double bonds. When the sulfur is attached to such compounds with a single bond, the sulfur will have another substituent group, such as but not limited to hydrogen, (C1-C12)alkyl, (C2-C12)alkenyl, (C6-C20)aryl, (C1-C12)alkylthio, (C2-C12)alkenylthio, (C6-C20)arylthio and the like. Likewise, the nitrogen will have one or more substituent groups, such as but not limited to hydrogen, (C1-C12)alkyl, (C2-C12)alkenyl, (C7-C10)aryl, and the like. The N—R—S functional group may be acyclic or cyclic. Compounds containing cyclic N—R—S functional groups include those having either the nitrogen or the sulfur or both the nitrogen and the sulfur within the ring system.

Further leveling agents are triethanolamine condensates as described in unpublished international Patent Application No. PCT/EP2009/066581.

In general, the total amount of leveling agents in the electroplating bath is from 0.5 ppm to 10000 ppm based on the total weight of the plating bath. The leveling agents according to the present invention are typically used in a total amount of from about 0.1 ppm to about 1000 ppm based on the total weight of the plating bath and more typically from 1 to 100 ppm, although greater or lesser amounts may be used. The electroplating baths according to the present invention may include one or more optional additives. Such optional additives include, but are not limited to, accelerators, suppressors, surfactants and the like. Such suppressors and accelerators are generally known in the art. It will be clear to one skilled in the art which suppressors and/or accelerators to use and in what amounts.

A large variety of additives may typically be used in the bath to provide desired surface finishes for the Cu plated metal. Usually more than one additive is used with each additive forming a desired function. Advantageously, the electroplating baths may contain one or more of accelerators, suppressors, sources of halide ions, grain refiners and mixtures thereof. Most preferably the electroplating bath contains both, an accelerator and a suppressor in addition to the leveling agent according to the present invention. Other additives may also be suitably used in the present electroplating baths.

Any accelerators may be advantageously used in the present invention. Accelerators useful in the present invention include, but are not limited to, compounds comprising one or more sulphur atom and a sulfonic/phosphonic acid or their salts.

The generally preferred accelerators have the general structure $M^4O_3X^4-R^{A1}-(S)^d-R^{A2}$, with:

$M^4$ is a hydrogen or an alkali metal (preferably Na or K)
$X^4$ is P or S
d=1 to 6
$R^{A1}$ is selected from C1-08 alkyl group or heteroalkyl group, an aryl group or a heteroaromatic group. Heteroalkyl groups will have one or more heteroatom (N, S, O) and 1-12 carbons. Carbocyclic aryl groups are typical aryl groups, such as phenyl, naphtyl. Heteroaromatic groups are also suitable aryl groups and contain one or more N, O or S atom and 1-3 separate or fused rings.
$R^{A2}$ is selected from H or ($-S-R^{A1'}XO_3M^{4'}$), with $R^{A1'}$ being selected among $R^{A1}$, wherein $R^{A1'}$ may be identical to or different from $R^{A1}$, and $M^{4'}$ being selected among $M^4$, wherein $M^{4'}$ may be identical to or different from $M^4$ More specifically, useful accelerators include those of the following formulae:

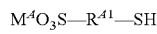

$M^4O_3S-R^{A1}-SH$

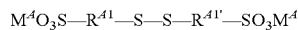

$M^4O_3S-R^{A1}-S-S-R^{A1'}-SO_3M^4$

$M^4O_3S-Ar-S-S-Ar-SO_3M^4$ with $R^{A1}$, $M^4$ as defined above and Ar is Aryl.
Particularly preferred accelerating agents are:
SPS: bis-(3-sulfopropyl)-disulfide disodium salt
MPS: 3-mercapto-1-propanesulfonic acid, sodium salt
Other examples of accelerators, used alone or in mixture, include, but are not limited to: MES (2-Mercaptoethanesulfonic acid, sodium salt); DPS (N,N-dimethyldithiocarbamic acid (3-sulfopropylester), sodium salt); UPS (3-[(amino-iminomethyl)-thio]-1-propylsulfonic acid); ZPS (3-(2-benzthiazolylthio)-1-propanesulfonic acid, sodium salt); 3-mercapto-propylsulfonicacid-(3-sulfopropyl)ester; methyl-(ω-sulphopropyl)-disulfide, disodium salt; methyl-(ω-sulphopropyl)-trisulfide, disodium salt.

Such accelerators are typically used in an amount of about 0.1 ppm to about 3000 ppm, based on the total weight of the plating bath. Particularly suitable amounts of accelerator useful in the present invention are 1 to 500 ppm, and more particularly 2 to 100 ppm.

Any suppressing agent may be advantageously used in the present invention. Suppressing agents useful in the present invention include, but are not limited to, polymeric materials, particularly those having heteroatom substitution, and more particularly oxygen substitution. It is preferred that the suppressing agent is a polyalkyleneoxide. Suitable suppressing agents include polyethylene glycol copolymers, particularly polyethylene glycol polypropylene glycol copolymers. The arrangement of ethylene oxide and propylene oxide of suitable suppressors may be block, gradient, or random. The polyalkylene glycol may comprise further alkylene oxide building blocks such as butylene oxide. Preferably, the average molecular weight of suitable suppressors exceeds about 2000 g/mol. The starting molecules of suitable polyalkylene glycol may be alkyl alcohols such as methanol, ethanol, propanol, n-butanol and the like, aryl alcohols such as phenols and bisphenols, alkaryl alcohols such as benzyl alcohol, polyol starters such as glycol, glycerin, trimethylol propane, pentaerythritol, sorbitol, carbohydrates such as saccharose, and the like, amines and oligoamines such as alkyl amines, aryl amines such as aniline, triethanol amine, ethylene diamine, and the like, amides, lactams, heterocyclic amines such as imidazol and carboxylic acids. Optionally, polyalkylene glycol suppressors may be functionalized by ionic groups such as sulfate, sulfonate, ammonium, and the like. Particularly useful suppressing agents in combination with the levelers according to the present inventions are:

(a) suppressing agents obtainable by reacting an amine compound comprising at least three active amino functional groups with a mixture of ethylene oxide and at least one compound selected from $C_3$ and $C_4$ alkylene oxides as described in European Patent Application No. 9157540.7.

Preferably the amine compound is selected from diethylene triamine, 3-(2-aminoethyl)aminopropylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.

(b) Suppressing agents obtainable by reacting an amine compound comprising active amino functional groups with a mixture of ethylene oxide and at least one compound selected from $C_3$ and $C_4$ alkylene oxides, said suppressing agent having a molecular weight $M_w$ of 6000 g/mol or more, forming an ethylene C3 and/or C4 alkylene random copolymer as described in European Patent Application No. 09157542.3.

(c) Suppressing agent obtainable by reacting an amine compound comprising at least three active amino functional groups with ethylene oxide and at least one compound selected from C3 and C4 alkylene oxides from a mixture or in sequence, said suppressing agent having a molecular weight $M_w$ of 6000 g/mol or more as described in European Patent Application No. 09157543.

Preferably the amine compound is selected from ethylene diamine, 1,3-diaminopropane, 1,4-diaminobutane, 1,5-diaminopentane, 1,6-diaminohexane, neopentanediamine, isophoronediamine, 4,9-dioxadecane-1,12-diamine, 4,7,10-trioxyatridecane-1,13-diamine, triethylene glycol diamine, diethylene triamine, (3-(2-aminoethyl)aminopropylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.

(d) Suppressing agent selected from compounds of formula S1

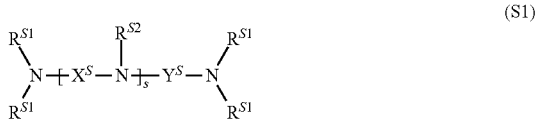
(S1)

wherein the $R^{S1}$ radicals are each independently selected from a copolymer of ethylene oxide and at least one further C3 to C4 alkylene oxide, said copolymer being a random copolymer, the $R^{S2}$ radicals are each independently selected from $R^{S1}$ or alkyl, $X^S$ and $Y^S$ are spacer groups independently, and $X^S$ for each repeating unit independently, selected from C2 to C6 alkylene and $Z^S$—(O—$Z^S$)$_t$ wherein the $Z^S$ radicals are each independently selected from C2 to C6 alkylene, s is an integer equal to or greater than 0, and t is an integer equal to or greater than 1, as described in European Patent Application No. 09005106.1.

Preferably spacer groups $X^S$ and $Y^S$ are independently, and $X^S$ for each repeating unit independently, selected from C2 to C4 alkylene. Most preferably $X^S$ and $Y^S$ are independently, and $X^S$ for each repeating unit independently, selected from ethylene (—$C_2H_4$—) or propylene (—$C_3H_6$—).

Preferably $Z^S$ is selected from C2 to C4 alkylene, most preferably from ethylene or propylene.

Preferably s is an integer from 1 to 10, more preferably from 1 to 5, most preferably from 1 to 3. Preferably t is an integer from 1 to 10, more preferably from 1 to 5, most preferably from 1 to 3.

In another preferred embodiment the C3 to C4 alkylene oxide is selected from propylene oxide (PO). In this case EO/PO copolymer side chains are generated starting from the active amino functional groups The content of ethylene oxide in the copolymer of ethylene oxide and the further C3 to C4 alkylene oxide can generally be from about 5% by weight to about 95% by weight, preferably from about 30% by weight to about 70% by weight, particularly preferably between about 35% by weight to about 65% by weight.

The compounds of formula (S1) are prepared by reacting an amine compound with one ore more alkylene oxides. Preferably the amine compound is selected from ethylene diamine, 1,3-diaminopropane, 1,4-diaminobutane, 1,5-diaminopentane, 1,6-diaminohexane, neopentanediamine, isophoronediamine, 4,9-dioxadecane-1,12-diamine, 4,7,10-trioxatridecane-1,13-diamine, triethylene glycol diamine, diethylene triamine, (3-(2-aminoethyl)amino)propylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.

The molecular weight $M_w$ of the suppressing agent of formula S1 may be between about 500 g/mol to about 30000 g/mol. Preferably the molecular weight $M_w$ should be about 6000 g/mol or more, preferably from about 6000 g/mol to about 20000 g/mol, more preferably from about 7000 g/mol to about 19000 g/mol, and most preferably from about 9000 g/mol to about 18000 g/mol. Preferred total amounts of alkylene oxide units in the suppressing agent may be from about 120 to about 360, preferably from about 140 to about 340, most preferably from about 180 to about 300.

Typical total amounts of alkylene oxide units in the suppressing agent may be about 110 ethylene oxide units (EO) and 10 propylene oxide units (PO), about 100 EO and 20 PO, about 90 EO and 30 PO, about 80 EO and 40 PO, about 70 EO and 50 PO, about 60 EO and 60 PO, about 50 EO and 70 PO, about 40 EO and 80 PO, about 30 EO and 90 PO, about 100 EO and 10 butylene oxide (BuO) units, about 90 EO and 20 BO, about 80 EO and 30 BO, about 70 EO and 40 BO, about 60 EO and 50 BO or about 40 EO and 60 BO to about 330 EO and 30 PO units, about 300 EO and 60 PO, about 270 EO and 90 PO, about 240 EO and 120 PO, about 210 EO and 150 PO, about 180 EO and 180 PO, about 150 EO and 210 PO, about 120 EO and 240 PO, about 90 EO and 270 PO, about 300 EO and 30 butylene oxide (BuO) units, about 270 EO and 60 BO, about 240 EO and 90 BO, about 210 EO and 120 BO, about 180 EO and 150 BO, or about 120 EO and 180 BO.

(e) Suppressing agent obtainable by reacting a polyhydric alcohol condensate compound derived from at least one polyalcohol of formula (S2) $X^S(OH)_u$ by condensation with at least one alkylene oxide to form a polyhydric alcohol condensate comprising polyoxyalkylene side chains, wherein u is an integer from 3 to 6 and $X^S$ is an u-valent linear or branched aliphatic or cycloaliphatic radical having from 3 to 10 carbon atoms, which may be substituted or unsubstituted, as described in U.S. Provisional Application No. 61/229803.

Preferred polyalcohol condensates are selected from compounds of formulae

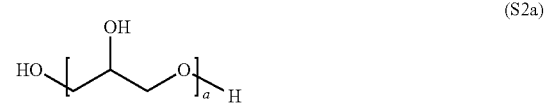
(S2a)

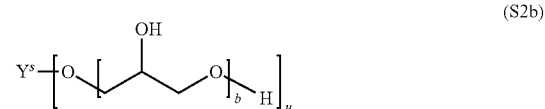
(S2b)

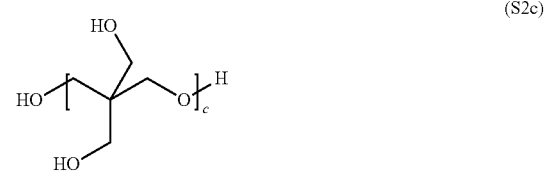
(S2c)

wherein $Y^S$ is an u-valent linear or branched aliphatic or cycloaliphatic radical having from 1 to 10 carbon atoms, which may be substituted or unsubstituted, a is an integer from 2 to 50, b may be the same or different for each polymer arm u and is an integer from 1 to 30, c is an integer from 2 to 3, and u is an integer from 1 to 6. Most preferred Polyalcohols are glycerol condensates and/or pentaerythritol condensates.

(f) Suppressing agent obtainable by reacting a polyhydric alcohol comprising at least 5 hydroxyl functional groups with at least one alkylene oxide to form a polyhydric alcohol comprising polyoxyalkylene side chains as described in U.S. Provisional Application No. 61/229809. Preferred polyalcohols are linear or cyclic monosaccharide alcohols represented by formula (S3a) or (S3b)

$HOCH_2$—$(CHOH)_v$—$CH_2OH$ (S3a)

$(CHOH)_w$ (S3b)

wherein v is an integer from 3 to 8 and w is an integer form 5 to 10. Most preferred monosaccharide alcohols are sorbitol, mannitol, xylitol, ribitol and inositol. Further preferred polyalcohols are monosaccharides of formula (S4a) or (S4b)

$$\text{CHO—(CHOH)}_x\text{—CH}_2\text{OH} \tag{S4a}$$

$$\text{CH}_2\text{OH—(CHOH)}_y\text{—CO—(CHOH)}_z\text{—CH}_2\text{OH} \tag{S4b}$$

wherein x is an integer of 4 to 5, and y, z are integers and y+z is 3 or 4. Most preferred monosaccharide alcohols are selected from the aldoses allose, altrose, galactose, glucose, gulose, idose, mannose, talose, glucoheptose, mannoheptose or the ketoses fructose, psicose, sorbose, tagatose, mannoheptulose, sedoheptulose, taloheptulose, alloheptulose.

These are particularly effective, strong suppressing agents that cope with the seed overhang issue and provide substantially defect free trench filling despite a non-conformal copper seed.

When suppressors are used, they are typically present in an amount in the range of from about 1 to about 10,000 ppm based on the weight of the bath, and preferably from about 5 to about 10,000 ppm.

The metal ion source may be any compound capable of releasing metal ions to be deposited in the electroplating bath in sufficient amount, i.e. is at least partially soluble in the electroplating bath. It is preferred that the metal ion source is soluble in the plating bath. Suitable metal ion sources are metal salts and include, but are not limited to, metal sulfates, metal halides, metal acetates, metal nitrates, metal fluoroborates, metal alkylsulfonates, metal arylsulfonates, metal sulfamates, metal gluconates and the like. It is preferred that the metal is copper. It is further preferred that the source of metal ions is copper sulfate, copper chloride, copper acetate, copper citrate, copper nitrate, copper fluoroborate, copper methane sulfonate, copper phenyl sulfonate and copper p-toluene sulfonate. Copper sulfate pentahydrate and copper methane sulfonate are particularly preferred. Such metal salts are generally commercially available and may be used without further purification.

Besides metal electroplating the compositions may be used in electroless deposition of metal containing layers. The compositions may particularly be used in the deposition of barrier layers containing Ni, Co, Mo, W and/or Re. In this case, besides metal ions, further elements of groups III and V, particularly B and P may be present in the composition for electroless deposition and thus co-deposited with the metals.

The metal ion source may be used in the present invention in any amount that provides sufficient metal ions for electroplating on a substrate. Suitable metal ion metal sources include, but are not limited to, tin salts, copper salts, and the like. When the metal is copper, the copper salt is typically present in an amount in the range of from about 1 to about 300 g/l of plating solution. It will be appreciated mixtures of metal salts may be electroplated according to the present invention. Thus, alloys, such as copper-tin having up to about 2 percent by weight tin, may be advantageously plated according to the present invention. The amounts of each of the metal salts in such mixtures depend upon the particular alloy to be plated and is well known to those skilled in the art.

In general, besides the metal ion source and at least one of the leveling agents, further referred to as polyimidazolium compounds, the present metal electroplating compositions preferably include electrolyte, i.e. acidic or alkaline electrolyte, one or more sources of metal ions, optionally halide ions, and optionally other additives like accelerators and/or suppressors. Such baths are typically aqueous. The water may be present in a wide range of amounts. Any type of water may be used, such as distilled, deionized or tap.

The electroplating baths of the present invention may be prepared by combining the components in any order. It is preferred that the inorganic components such as metal salts, water, electrolyte and optional halide ion source, are first added to the bath vessel followed by the organic components such as leveling agents, accelerators, suppressors, surfactants and the like.

Typically, the plating baths of the present invention may be used at any temperature from 10 to 65 degrees C. or higher. It is preferred that the temperature of the plating baths is from 10 to 35 degrees C. and more preferably from 15 degrees to 30 degrees C.

Suitable electrolytes include such as, but not limited to, sulfuric acid, acetic acid, fluoroboric acid, alkylsulfonic acids such as methanesulfonic acid, ethanesulfonic acid, propanesulfonic acid and trifluoromethane sulfonic acid, arylsulfonic acids such as phenyl sulfonic acid and toluenesulfonic acid, sulfamic acid, hydrochloric acid, phosphoric acid, tetraalkylammonium hydroxide, preferably tetramethylammonium hydroxide, sodium hydroxide, potassium hydroxide and the like. Acids are typically present in an amount in the range of from about 1 to about 300 g/l, alkaline electrolytes are typically present in an amount of about 0.1 to about 20 g/l or to yield a pH of 8 to 13 respectively, and more typically to yield a pH of 9 to 12.

Such electrolytes may optionally contain a source of halide ions, such as chloride ions as in copper chloride or hydrochloric acid. A wide range of halide ion concentrations may be used in the present invention such as from about 0 to about 500 ppm. Typically, the halide ion concentration is in the range of from about 10 to about 100 ppm based on the plating bath. It is preferred that the electrolyte is sulfuric acid or methanesulfonic acid, and preferably a mixture of sulfuric acid or methanesulfonic acid and a source of chloride ions. The acids and sources of halide ions useful in the present invention are generally commercially available and may be used without further purification.

The general process of copper electrodeposition on semiconductor integrated circuit substrates is described with respect to FIGS. 1 and 2 without restricting the invention thereto.

Figure 1B:
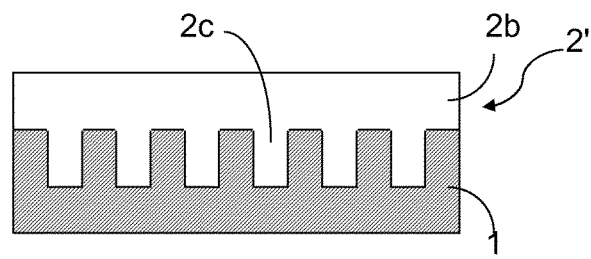
Figure 1C:
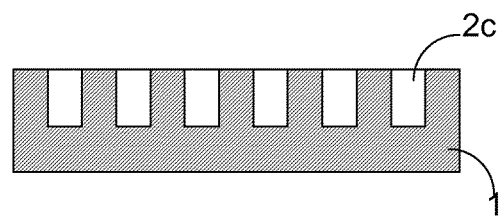

FIG. 1a shows a dielectric substrate 1 seeded with a copper layer 2a. With reference to FIG. 1b a copper layer 2' is deposited onto the dielectric substrate 1 by electrodeposition. The trenches 2c of the substrate 1 are filled and an overplating of copper 2b, also referred to as "overburden", is generated on top of the whole structured substrate. During the process, after optional annealing, the overburden of copper 2b is removed by chemical mechanical planarization (CMP), as depicted in FIG. 1c.

Figure 2A:
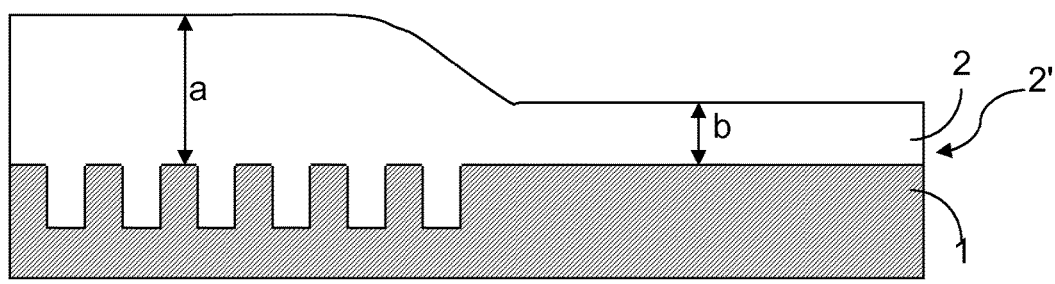
FIG. 2a-b. 2a) and 2b) show effects of a leveling agent.
Figure 2B:
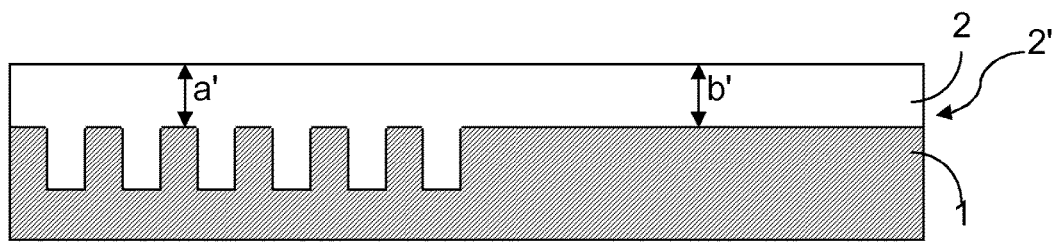

The effect of a leveling agent is generally described with respect to FIGS. 2a and 2b. Without a leveling agent the deposition leads to a high ratio a/b>>1, the so called mounding. In contrast, the aim is to reduce the ratio a/b to a value, which is as close as possible to 1.

A particular advantage of the present invention is that overplating, particularly mounding, is reduced or substantially eliminated. Such reduced overplating means less time and effort is spent in removing metal, such as copper, during subsequent chemical-mechanical planarization (CMP) processes, particularly in semiconductor manufacture. A further advantage of the present invention is that a wide range of aperture sizes may be filled within a single substrate resulting in a substantially even surface having a ratio a/b of 1.5 or less, preferably 1.2 or less, most preferably 1.1 or less. Thus, the present invention is particularly suitable to evenly filling apertures in a substrate having a variety of aperture sizes, such as from 0.01 micrometer to 100 micrometer or even larger.

A further significant advantage of this leveling effect is that less material has to be removed in post-deposition operations. For example, chemical mechanical planarization (CMP) is used to reveal the underlying features. The more level deposit of the invention corresponds to a reduction in the amount of metal which must be deposited, therefore resulting in less removal later by CMP. There is a reduction in the amount of scrapped metal and, more significantly, a reduction in the time required for the CMP operation. The material removal operation is also less severe which, coupled with the reduced duration, corresponds to a reduction in the tendency of the material removal operation to impart defects.

Metal, particularly copper, is deposited in apertures according to the present invention without substantially forming voids within the metal deposit. By the term "without substantially forming voids", it is meant that 95% of the plated apertures are void-free. It is preferred that the plated apertures are void-free.

Typically, substrates are electroplated by contacting the substrate with the plating baths of the present invention. The substrate typically functions as the cathode. The plating bath contains an anode, which may be soluble or insoluble. Optionally, cathode and anode may be separated by a membrane. Potential is typically applied to the cathode. Sufficient current density is applied and plating performed for a period of time sufficient to deposit a metal layer, such as a copper layer, having a desired thickness on the substrate. Suitable current densities, include, but are not limited to, the range of 1 to 250 mA/cm$^2$. Typically, the current density is in the range of 1 to 60 mA/cm$^2$ when used to deposit copper in the manufacture of integrated circuits. The specific current density depends upon the substrate to be plated, the leveling agent selected and the like. Such current density choice is within the abilities of those skilled in the art. The applied current may be a direct current (DC), a pulse current (PC), a pulse reverse current (PRC) or other suitable current.

In general, when the present invention is used to deposit metal on a substrate such as a wafer used in the manufacture of an integrated circuit, the plating baths are agitated during use. Any suitable agitation method may be used with the present invention and such methods are well-known in the art. Suitable agitation methods include, but are not limited to, inert gas or air sparging, work piece agitation, impingement and the like. Such methods are known to those skilled in the art. When the present invention is used to plate an integrated circuit substrate, such as a wafer, the wafer may be rotated such as from 1 to 150 RPM and the plating solution contacts the rotating wafer, such as by pumping or spraying. In the alternative, the wafer need not be rotated where the flow of the plating bath is sufficient to provide the desired metal deposit.

While the process of the present invention has been generally described with reference to semiconductor manufacture, it will be appreciated that the present invention may be useful in any electrolytic process where an essentially level or planar copper deposit having high reflectivity is desired, and where reduced overplating and metal filled small features that are substantially free of voids are desired. Such processes include printed wiring board manufacture. For example, the present plating baths may be useful for the plating of vias, pads or traces on a printed wiring board, as well as for bump plating on wafers. Other suitable processes include packaging and interconnect manufacture. Accordingly, suitable substrates include lead frames, interconnects, printed wiring boards, and the like.

Plating equipment for plating semiconductor substrates are well known. Plating equipment comprises an electroplating tank which holds Cu electrolyte and which is made of a suitable material such as plastic or other material inert to the electrolytic plating solution. The tank may be cylindrical, especially for wafer plating. A cathode is horizontally disposed at the upper part of tank and may be any type substrate such as a silicon wafer having openings such as trenches and vias. The wafer substrate is typically coated with a seed layer of Cu or other metal to initiate plating thereon. A Cu seed layer may be applied by chemical vapor deposition (CVD), physical vapor deposition (PVD), or the like. An anode is also preferably circular for wafer plating and is horizontally disposed at the lower part of tank forming a space between the anode and cathode. The anode is typically a soluble anode.

These bath additives are useful in combination with membrane technology being developed by various tool manufacturers. In this system, the anode may be isolated from the organic bath additives by a membrane. The purpose of the separation of the anode and the organic bath additives is to minimize the oxidation of the organic bath additives.

The cathode substrate and anode are electrically connected by wiring and, respectively, to a rectifier (power supply). The cathode substrate for direct or pulse current has a net negative charge so that Cu ions in the solution are reduced at the cathode substrate forming plated Cu metal on the cathode surface. An oxidation reaction takes place at the anode. The cathode and anode may be horizontally or vertically disposed in the tank.

The present invention is useful for depositing a metal layer, particularly a copper layer, on a variety of substrates, particularly those having variously sized apertures. For example, the present invention is particularly suitable for depositing copper on integrated circuit substrates, such as semiconductor devices, with small diameter vias, trenches or other apertures. In one embodiment, semiconductor devices are plated according to the present invention. Such semiconductor devices include, but are not limited to, wafers used in the manufacture of integrated circuits.

While the process of the present invention has been generally described with reference to semiconductor manufacture, it will be appreciated that the present invention may be useful in any electrolytic process where an essentially level or planar copper deposit having high reflectivity is desired. Accordingly, suitable substrates include lead frames, interconnects, printed wiring boards, and the like.

All percent, ppm or comparable values refer to the weight with respect to the total weight of the respective composition except where otherwise indicated. All cited documents are incorporated herein by reference.

The following examples shall further illustrate the present invention without restricting the scope of this invention.

EXAMPLES

Example 1

Leveler Preparation

Leveler 1

1 mol of formalin, 1 mol of glyoxal and 1 mol of glacial acetic acid are placed in a reaction vessel. 1 mol of 1,4- butanediamine (melted by means of a hairdryer, m.p. 25-28° C.) are added dropwise at room temperature (exothermic, icebath cooling).

Mixture is stirred overnight at RT.

The black-brown mixture is evaporated on a rotary evaporator at a maximum of 70° C. (1 mbar) (foams, codistilled with EtOH/toluene).

The product received was used without further purification. If needed, it may be purified using standard methods or may be subjected to an anion exchange.

Leveler 2

Reference leveler 2 is a reaction product from 1,4-butanediol diglycidylether with imidazole. leveler 2 has been prepared as described in European patent application EP1619274 A2, example 6.

Leveler 3

Reference leveler 3 is the commercial product Raluplate IME which has been purchased from Raschig GmbH. Raluplate IME is the reaction product from epichlorohydrin and imidazole.

Suppressor 1

Suppressor 1 is a EO/PO copolymer having a molecular weight of <13000 g/mole and terminal hydroxyl groups.

Suppressor 2

Suppressor 2 is an EO/PO copolymer having a molecular weight of <5000 g/mole and terminal hydroxyl groups.

Figure 4A:
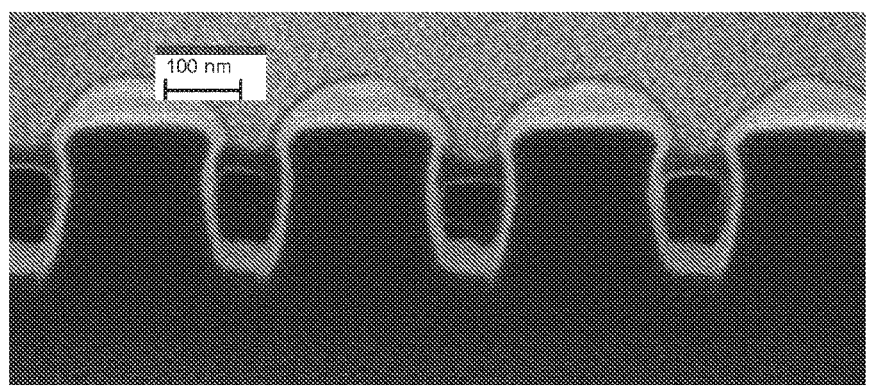

Plating experiments with substrates carrying 100 nm wide trenches (FIG. 4a) and plating bath solutions containing either leveler 1 according to the present invention (FIG. 4b) or reference leveler 3 (FIGS. 4d, 4e and 4f) reveal that the invention provides defect-free and especially void-free gap filling while efficiently levelling, whereas the plating experiment with leveler 3 as levelling agent results in significant void formation in the 100 nm trenches. Decreasing the concentration of levelling agent in case of leveler 3 resulted in decrease of levelling efficiency without preventing void formation as shown in FIG. 4f. The control experiment (FIG. 4c) accomplished without any levelling agent in the plating bath solution clearly reveals bump formation over the trenches and thus indicates the levelling efficiency of the invention while providing defect-free Cu deposits.

Further plating experiments have been performed with substrates comprising apertures of 130 nm width and plating bath solutions containing reference leveler 2 as levelling agent. As further reference also a plating bath solution without any levelling agent was used. The resulting SEM images are shown in FIGS. 5b and 5a, respectively. FIGS. 5a and 5b clearly show that reference leveler 2 reduces the bump formation over the aperture array only very slightly if at all in comparison to the bath comprising no leveler.

Figure 3A:
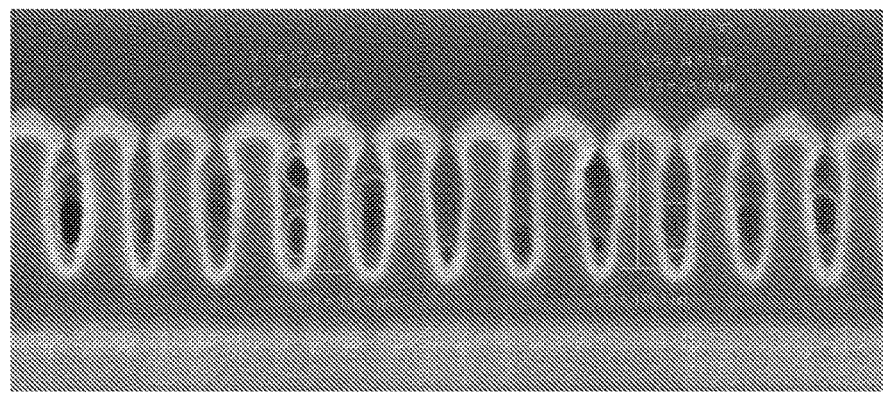

Additionally plating experiments have been performed with substrates carrying 16 to 37 nm wide trenches (FIG. 3a) and plating bath solutions containing either the leveler 1 according to the present invention (FIG. 3b) or no leveler (FIG. 3c). The SEM image shown in FIG. 3b reveals that leveler 1 provides defect-free, also meaning void-free, gap fill as also found with the substrate plated without any levelling agent in the plating bath solution (FIG. 3c).

The use of a polyimidazolium compound according to the present invention as levelling agent thus provides excellent levelling efficiency without interfering with the bottom-up-fill causing voids.

Comparative Example 2

A plating bath was prepared by combining DI water, 40 g/l copper as copper sulfate, 10 g/l sulfuric acid, 0.050 g/l chloride ion as HCl, 0.028 g/l of SPS and 2.00 ml/l of a 5.3% by weight solution in DI water of suppressor 1.

A copper layer was electroplated onto a wafer substrate with feature sizes shown in FIG. 3a (16 to 37 nm trench width, 173 to 176 nm trench depth) provided with a copper seed layer by contacting the wafer substrate with the above described plating bath at 25 degrees C. applying a direct current of −5 mA/cm$^2$ for 6 s. The thus electroplated copper layer was cross-sectioned and investigated by SEM inspection.

The result is shown in FIG. 3c providing the SEM image of fully filled trenches without exhibiting any defects like voids or seams.

Example 3

The procedure of example 2 was repeated except that 0.3125 ml/l of a 1% by weight aqueous solution of polyimidazolium compound leveler 1 as prepared in example 1 was added to the plating bath.

A copper layer was electroplated onto a wafer substrate as described in example 2. The thus electroplated copper layer was cross-sectioned and investigated by SEM inspection.

Figure 3B:
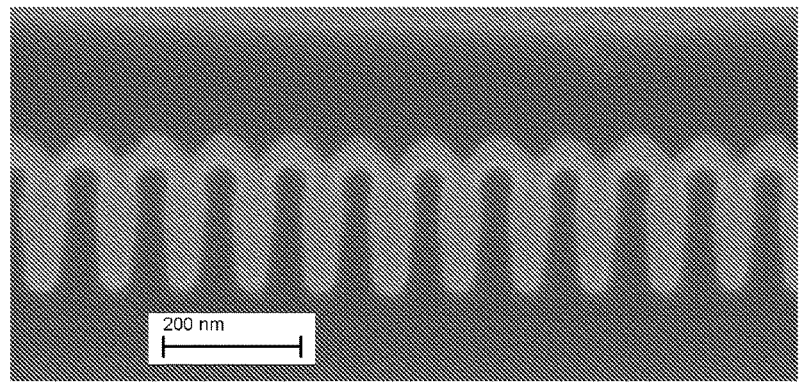
Figure 3B:
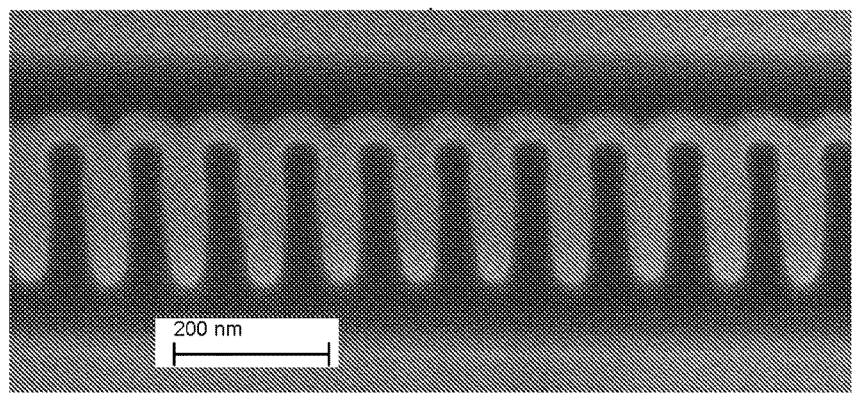

The result using a plating bath with leveler 1 as prepared in example 1 according to the present invention is shown in FIG. 3b. The 16 to 37 nanometer wide trenches are completely filled without exhibiting any defects like voids or seams thus showing that there is not any interference with the gapfilling by the leveling agent.

Comparative Example 4

A plating bath according to example 2 was prepared.

A copper layer was electroplated onto a wafer substrate with feature sizes shown in FIG. 4a (100 nm trench width) provided with a copper seed layer by contacting the wafer substrate with the above described plating bath at 25 degrees C. applying a direct current of −5 mA/cm$^2$ for 27 s followed by −10 mA/cm$^2$ for 27 s. The thus electroplated copper layer was cross-sectioned and investigated by SEM inspection.

The result is shown in FIG. 4c providing the SEM image of fully filled trenches without exhibiting any defects like voids or seams. FIG. 4c clearly reveals bump formation over the 100 nm trenches.

Example 5

The plating bath of example 2 was used except that 0.625 ml/l of a 1% by weight aqueous solution of leveler 1 was added to the plating bath.

A copper layer was electroplated onto a wafer substrate with feature sizes shown in FIG. 4a (100 nm trench width) provided with a copper seed layer by contacting the wafer substrate with the above described plating bath at 25 degrees C. applying a direct current of −5 mA/cm$^2$ for 27 s followed by −10 mA/cm$^2$ for 27 s. The thus electroplated copper layer was cross-sectioned and investigated by SEM inspection.

Figure 4B:
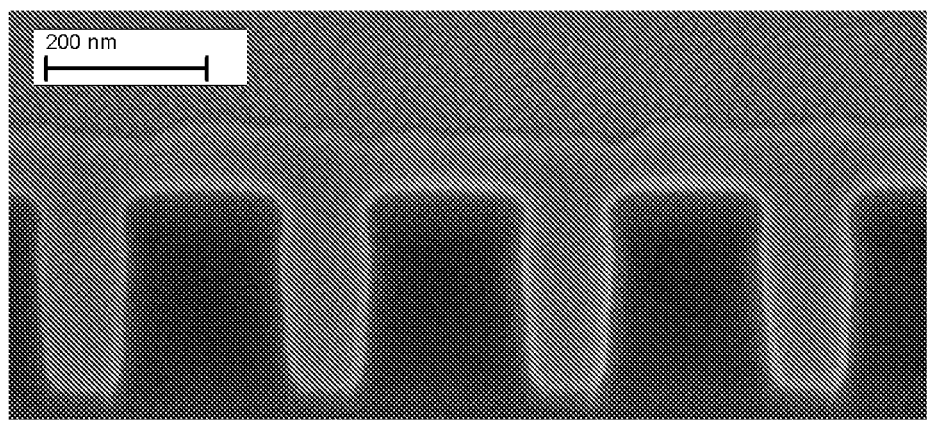
Figure 4B:
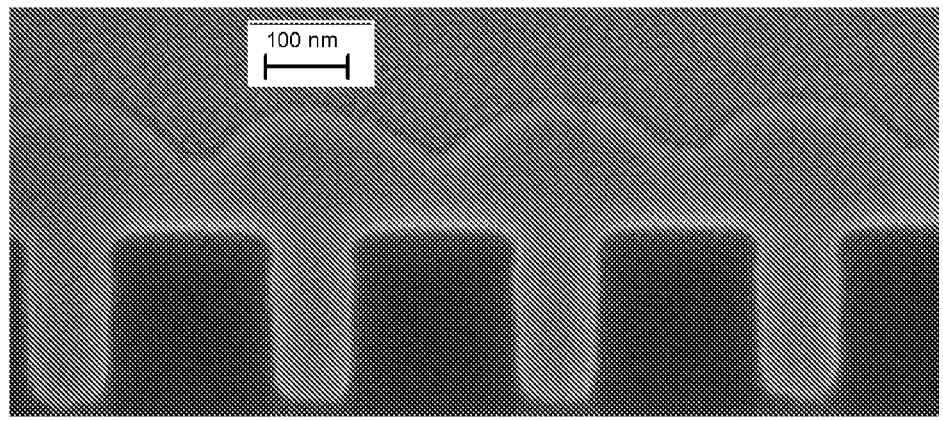

The result is shown in FIG. 4b providing the SEM image of fully filled trenches without exhibiting any defects like voids or seams while efficiently preventing bump formation.

Comparative Example 6

The plating bath of example 2 was used except that 1.25 ml/l of a 1% by weight aqueous solution of reference leveler 3 was added to the plating bath.

A copper layer was electroplated onto a wafer substrate with feature sizes shown in FIG. 4a (100 nm trench width) provided with a copper seed layer by contacting the wafer substrate with the above described plating bath at 25 degrees C. applying a direct current of −5 mA/cm$^2$ for 27 s followed by −10 mA/cm$^2$ for 27 s. The thus electroplated copper layer was cross-sectioned and investigated by SEM inspection.

The result using a plating bath with the reference compound L3 as leveling agent is shown in FIG. 4d. FIG. 4d exhibits a strong void formation within the treches.

Comparative Example 7

Example 6 was repeated except that a direct current of −5 mA/cm$^2$ for 27 s was applied. The thus electroplated copper layer was cross-sectioned and investigated by SEM inspection.

The result using a plating bath with the reference leveler 3 as leveling agent to partially fill the 100 nm wide trenches is shown in FIG. 4e. FIG. 4e reveals that the Cu deposition in the trenches is significantly conformal as indicated by the Cu deposit on the trench sidewalls shown in FIG. 4e which results in seam and void formation as seen in FIG. 4d.

Comparative Example 8

Example 6 was repeated except that 0.625 ml/l of a 1% by weight aqueous solution of the reference leveler 3 was added to the plating bath.

The result is shown in FIG. 4f. FIG. 4f exhibits a rougher surface of the Cu deposit due to a lower leveling efficiency of leveler 3 at lower concentration. Void formation is still obvious pointing to mainly conformal Cu growth in the trenches rather than bottom-up-fill deposition.

Comparative Example 9

A plating bath was prepared by combining DI water, 40 g/l copper as copper sulfate, 10 g/l sulfuric acid, 0.050 g/l chloride ion as HCl, 0.028 g/l of SPS and 0.100 g/l of suppressor 2.

A copper layer was electroplated onto a wafer substrate with feature sizes of 130 nm provided with a copper seed layer by contacting the wafer substrate with the above described plating bath at 25 degrees C. applying a direct current of 31 5 mA/cm$^2$ for 2 minutes followed by −10 mA/cm$^2$ for 1 minute. The thus electroplated copper layer was cross-sectioned and investigated by SEM inspection.

The result is shown in FIG. 5a providing the SEM image of fully filled trenches. Since there is no leveler present in the plating solution there is high mounding above the region of dense features (left) in comparison with the region having no features (right).

Comparative Example 10

The procedure of example 9 was repeated except that 0.02 ml/l of a 10% by weight aqueous solution of reference leveler 2 was added to the plating bath.

The result is shown in FIG. 5b providing the SEM image of fully filled trenches. No significant leveling effect can be observed in comparison to FIG. 5a.

The invention claimed is:

1. A composition, comprising:
a source of metal ions, wherein the metal ions comprise copper ions;
an additive comprising a linear or branched, polymeric imidazolium compound comprising a structural unit of the formula L1:

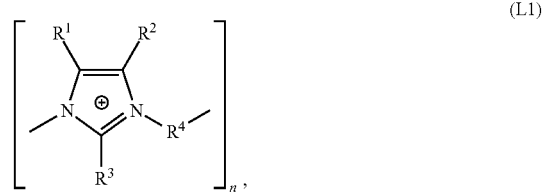

wherein:
R$^1$, R$^2$, R$^3$ are each independently selected from the group consisting of an H atom and an organic radical comprising from 1 to 20 carbon atoms,
R$^4$ is a divalent, trivalent or multivalent organic radical which does not comprise a hydroxyl group in an α or a β position relative to the nitrogen atom of an imidazole ring connected to R$^4$, and
n is an integer from 2 to 6,000;
water, and
an acid in a concentration of from 1 to 300 g/l,
wherein the composition is acidic.

2. The composition according to claim 1, wherein R$^1$ and R$^2$ are H atoms.

3. The composition according to claim 1, wherein R$^3$ is an H atom.

4. The composition according claim 1, wherein R$^4$ is a substituted or an unsubstituted C2 to C20 alkandiyl.

5. The composition according to claim 4, wherein R$^4$ does not comprise hydroxyl groups.

6. The composition according claim 1, wherein the additive comprises a counterion Y$^{o−}$, wherein o is an integer from 1 to 4.

7. The composition according to claim 6, wherein the counterion Y$^{o−}$ is a chloride, a sulfate or an acetate.

8. The composition according to claim 1, wherein a number average molecular weight M$_n$ of the polymeric imidazolium compound, determined by gel permeation chromatography, is greater than 500 g/mol.

9. The composition according to claim 1, wherein the polymeric imidazolium compound comprises more than 80% by weight of structural units of the formula L1.

10. The composition according to claim 1, wherein the additive is prepared by reacting
an α-dicarbonyl compound R$^1$—CO—CO—R$^2$,
an aldehyde R$^3$—CHO,
at least one amino compound (NH$_2$—)$_m$R$^4$, wherein m is an integer greater than or equal to 2 and
a protic acid (H$^+$)$_o$Y$^{o−}$, wherein Y$^{o−}$ is an anion of the protonic acid and o is an integer.

11. The composition according to claim 10, wherein the amino compound is an aliphatic or aromatic diamine, triamine, multiamine, or mixtures thereof.

12. The composition according to claim 1, further comprising an accelerating agent.

13. The composition according to claim 1, further comprising a suppressing agent.

14. The composition according to claim 1, wherein an amount of the polymeric imidazolium compound in the composition is from 0.1 to 1000 ppm.

15. A process, comprising:
a) contacting a metal plating bath comprising the composition according to claim 1 with a substrate, and
b) applying a current density to the substrate for a time sufficient to deposit a metal layer onto the substrate.

16. The process according to claim 15, wherein the substrate comprises micrometer or submicrometer sized features, and the metal layer is deposited to fill the micrometer or submicrometer sized features.

17. The process according to claim 16, wherein the micrometer or submicrometer sized features have a size of from 1 to 1000 nm, an aspect ratio of 4 or more, or both.

18. A method of producing a metal containing layers, the method comprising:

electrodepositing metal containing layers in a bath comprising copper ions and water in the presence of an additive comprising a linear or branched, polymeric imidazolium compound comprising a structural unit of the formula L1:

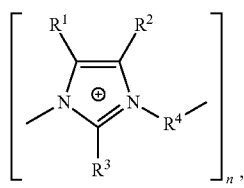

(L1)

wherein:

$R^1$, $R^2$, $R^3$ are each independently selected from the group consisting of an H atom and an organic radical comprising from 1 to 20 carbon atoms, $R^4$ is a divalent, trivalent or multivalent organic radical which does not comprise a hydroxyl group in an α or a β position relative to the nitrogen atom of an imidazole ring connected to $R^4$, and n is an integer from 2 to 6,000, and an acid in a concentration of from 1 to 300 g/l, wherein the bath is acidic.

19. The method according to claim 18, wherein an amount of the polymeric imidazolium compound in the bath is from 0.1 to 1000 ppm.

* * * * *